United States Patent
Sakuda et al.

(10) Patent No.: US 9,751,554 B2
(45) Date of Patent: Sep. 5, 2017

(54) STEERING SYSTEM

(71) Applicant: JTEKT CORPORATION, Osaka-shi, Osaka (JP)

(72) Inventors: Masayoshi Sakuda, Kashihara (JP); Michiaki Yamaoka, Ikoma-gun (JP); Ryota Okano, Hamamatsu (JP)

(73) Assignee: JTEKT CORPORATION, Osaka (JP)

( * ) Notice: Subject to any disclaimer, the term of this patent is extended or adjusted under 35 U.S.C. 154(b) by 146 days.

(21) Appl. No.: 14/958,081

(22) Filed: Dec. 3, 2015

(65) Prior Publication Data

US 2016/0167693 A1 Jun. 16, 2016

(30) Foreign Application Priority Data

Dec. 12, 2014 (JP) ................... 2014-252428

(51) Int. Cl.
*B62D 1/19* (2006.01)

(52) U.S. Cl.
CPC ............. *B62D 1/192* (2013.01); *B62D 1/195* (2013.01)

(58) Field of Classification Search
CPC ................................ B62D 1/192; B62D 1/195
See application file for complete search history.

(56) References Cited

FOREIGN PATENT DOCUMENTS

| EP | 0 289 133 A2 | 11/1988 |
| EP | 1 916 175 A2 | 4/2008 |
| JP | 2005-138758 A | 6/2005 |

OTHER PUBLICATIONS

May 3, 2016 Extended Search Report issued in European Patent Application No. 15198487.9.

*Primary Examiner* — Karen Beck
(74) *Attorney, Agent, or Firm* — Oliff PLC

(57) ABSTRACT

A steering system includes a column jacket that can extend and contract in an axial direction as a result of relative movement between an inner jacket and an outer jacket that houses the inner jacket, a regulation member fixed to the outer jacket and passing through an insertion hole in the inner jacket, and an elastic member fixed to the outer jacket. At the time of vehicular collision, when the regulation member is sheared by a peripheral portion of the insertion hole in the inner jacket in conjunction with the relative movement between the inner jacket and the outer jacket, a tip portion of the elastic member is fitted in the insertion hole.

4 Claims, 6 Drawing Sheets

STEERING SYSTEM

INCORPORATION BY REFERENCE

The disclosure of Japanese Patent Application No. 2014-252428 filed on Dec. 12, 2014 including the specification, drawings and abstract, is incorporated herein by reference in its entirety.

BACKGROUND OF THE INVENTION

1. Field of the Invention

The present invention relates to a steering system.

2. Description of Related Art

A steering system described in Japanese Patent Application Publication No. 2005-138758 (JP 2005-138758 A) includes a lower column, an upper column that can telescopically and slidably extend and contract with respect to the lower column, and a lower shaft and an upper shaft that are rotatably supported in the lower and upper columns, respectively. At the time of vehicular secondary collision, the upper shaft slides with respect to the lower shaft.

A stopper member is provided at a rear end of the outer column. The stopper member includes a support pin protruding from the stopper member toward opposite sides in a lateral direction and an abutting contact portion extending generally downward from the support pin. An opening is formed in each of the lower and upper columns such that the abutting contact portion of the stopper is inserted through the openings. A pair of support wall portions is formed on the lower column such that each of the support wall portions is located adjacently to the opening in the lower column. In each of the support wall portions, a support groove is formed which supports the support pin. A spring pin is inserted between each of the support wall portions and the stopper member and is rotatable around the spring pin.

When the upper column is pulled out, a front edge of the opening in the upper column comes into abutting contact with the abutting contact portion of the stopper member. When the upper column is pushed in, a rear edge of the opening in the upper column comes into abutting contact with the abutting contact portion of the stopper member.

In the steering system described in JP 2005-138758 A, at the time of a secondary collision, an impact load acting toward the front of a vehicle is imposed on the support pin, and the support pin is sheared to slip out from the support grooves. At this time, the stopper member rotates to cause the abutting contact portion to slip out from the opening in the upper column. Thus, when an attempt is made to pull out the upper column after the secondary collision, the upper column is detached from the lower column because the edges of the opening do not come in abutting contact with the abutting contact portion.

SUMMARY OF THE INVENTION

An object of the present invention is to provide a steering system including an inner jacket and an outer jacket that are movable relative to each other and allowing prevention of a situation where one of the inner and outer jackets is detached from the other jacket after a secondary collision.

In an aspect of the present invention, a steering system includes:

a steering member;

a steering shaft to which the steering member is coupled at one end of the steering shaft and which is configured to extend and contact in an axial direction;

a column jacket having an inner jacket in which an insertion hole extending in the axial direction is provided in an outer surface of the inner jacket and which supports the steering shaft, and an outer jacket that houses the inner jacket to support the steering shaft, the column jacket configured to extend and contract in the axial direction along with the steering shaft as a result of relative movement between the inner jacket and the outer jacket in the axial direction;

a regulation member that is fixed to the outer jacket and passes through the insertion hole and that regulates a distance of the relative movement between the inner jacket and the outer jacket to within a range in which the regulation member is allowed to move in the axial direction within the insertion hole, the regulation member allowed to be sheared; and an elastic member that has a tip portion arranged on the outer surface of the inner jacket at a position away from the insertion hole in the axial direction and that is fixed to the outer jacket.

When, at a time of vehicular collision, the regulation member is sheared by a peripheral portion of the insertion hole in the inner jacket in conjunction with the relative movement between the inner jacket and the outer jacket, the elastic member is elastically deformed so that the tip portion is fitted in the insertion hole.

In the steering system of the above-described aspect, the column jacket configured to extend and contract in the axial direction along with the steering shaft has the inner jacket and the outer jacket that support the steering shaft. The insertion hole extending in the axial direction is provided in the outer surface of the inner jacket. The outer jacket houses the inner jacket. The inner jacket and the outer jacket move relative to each other in the axial direction so that the column jacket extends and contracts.

The regulation member fixed to the outer jacket and allowed to be sheared passes through the insertion hole. The regulation member in this state regulates the distance of relative movement between the inner jacket and the outer jacket to within the range in which the regulation member is allowed to move in the axial direction within the insertion hole.

The tip portion of the elastic member fixed to the outer jacket is arranged on the outer surface of the inner jacket at the position away from the insertion hole in the axial direction. The elastic member in this state does not hinder the relative movement between the inner jacket and the outer jacket, in other words, the extension and contraction of the column jacket because the tip portion of the elastic member is not fitted in the insertion hole.

On the other hand, at the time of vehicular collision, when the regulation member is sheared by the peripheral portion of the insertion hole in the inner jacket in conjunction with the relative moment between the inner jacket and the outer jacket, the elastic member is elastically deformed so that the tip portion thereof is fitted in the insertion hole. Thus, the inner jacket and the outer jacket are coupled together via the elastic member. This prevents a situation where one of the inner and outer jackets is detached from the other after the vehicular collision.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described below in detail with reference to the attached drawings.

Figure 1:
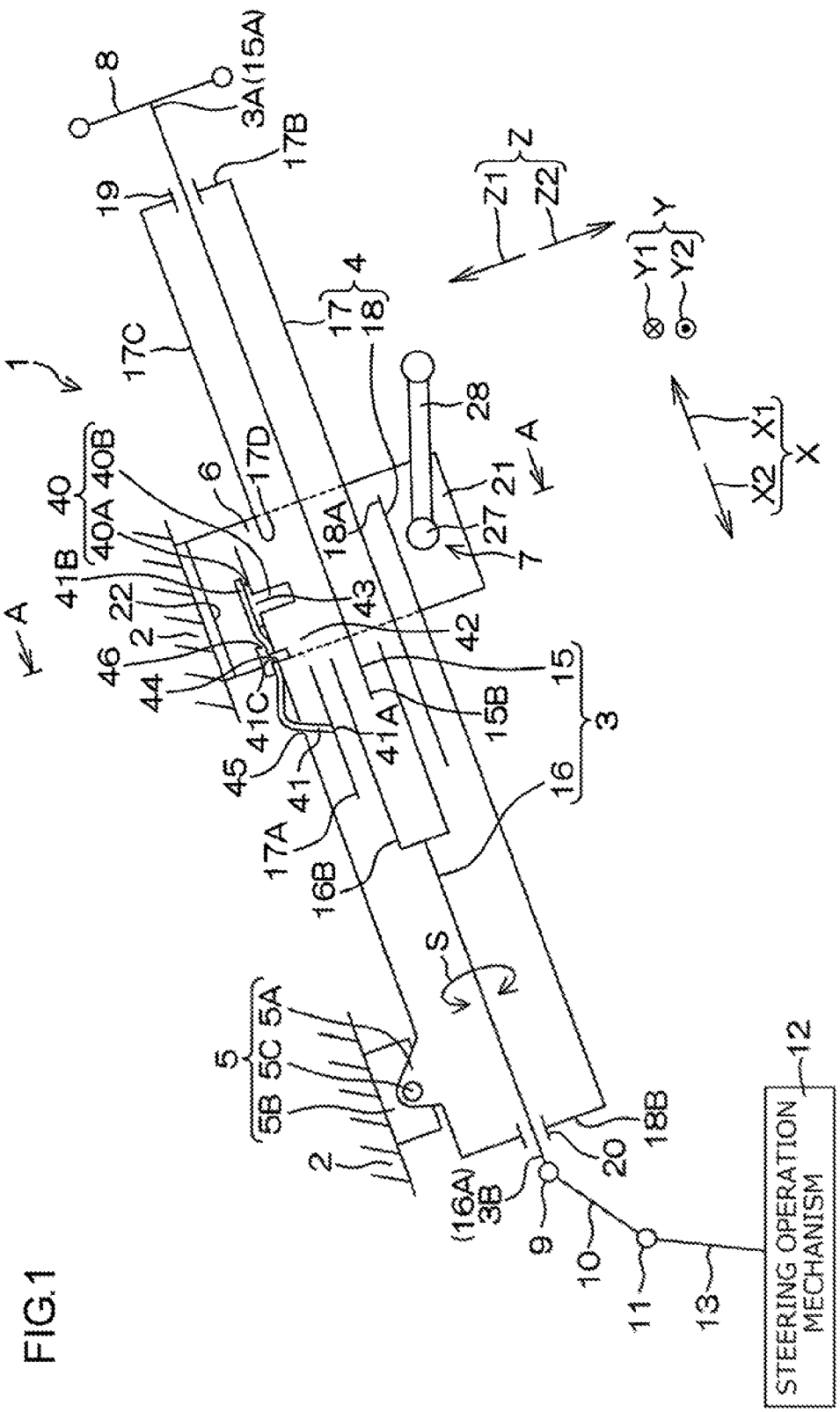
FIG. 1 is a schematic diagram of a steering system according to an embodiment of the present invention.

FIG. 1 is a schematic diagram of a steering system 1 according to an embodiment of the present invention. In FIG. 1, the left side of the sheet corresponds to a front side of a vehicle body 2 to which the steering system 1 is attached. The right side of the sheet corresponds to a rear side of the vehicle body 2, the upper side of the sheet corresponds to an upper side of the vehicle body 2, and the lower side of the sheet corresponds to a lower side of the vehicle body 2.

As seen in FIG. 1, the steering system 1 includes a steering shaft 3, a column jacket 4, a lower bracket 5, an upper bracket 6, and a lock and unlock mechanism 7.

A steering member 8 is coupled to an end 3A of the steering shaft 3 that is a rear end of the steering shaft 3. The other end 3B of the steering shaft 3 that is a front end of the steering shaft 3 is coupled to a pinion shaft 13 of a steering operation mechanism 12 via a universal joint 9, an intermediate shaft 10, and a universal joint 11 in this order. The steering operation mechanism 12 includes a rack and pinion mechanism. The steering operation mechanism 12 steers steered wheels not depicted in the drawings in response to transmission of rotation of the steering shaft 3.

The steering shaft 3 extends in a front-rear direction of the vehicle body. A direction in which the steering shaft 3 extends is referred to as an axial direction X. The axial direction X is inclined with respect to the horizontal direction such that the end 3B is lower than the end 3A. A rear side corresponding to the steering member 8 side in the axial direction X is denoted by reference character X1. A front side that is the opposite side from the steering member 8 side in the axial direction is denoted by reference character X2.

Among directions crossing the axial direction X, a direction perpendicular to the sheet of FIG. 1 is referred to as a lateral direction Y. A direction extending generally up and down in FIG. 1 is referred to as an up-down direction Z. In the lateral direction Y, a side of the sheet of FIG. 1 that is farther from the reader represents a right side Y1. A side of the sheet of FIG. 1 that is closer to the reader represents a left side Y2. In the up-down direction Z, an upper side is denoted by reference character Z1. A lower side is denoted by reference character Z2.

In the figures subsequent to FIG. 1, the same reference characters as those in FIG. 1 are used to denote the directions corresponding to the axial direction X, the rear side X1, the front side X2, the lateral direction Y, the right side Y1, the left side Y2, the up-down direction Z, the upper side Z1, and the lower side Z2.

The steering shaft 3 has a columnar upper shaft 15 that is long in the axial direction X and a lower shaft 16 that is cylindrical at least at a rear end thereof. The upper shaft 15 is arranged on the rear side X1 of the lower shaft 16 so as to be coaxial with the lower shaft 16. A rear end 15A of the upper shaft 15 corresponds to the end 3A of the steering shaft 3. A front end 16A of the lower shaft 16 corresponds to the end 3B of the steering shaft 3. A front end 15B of the upper shaft 15 is inserted from the rear side X1 into a cylindrical rear end 16B of the lower shaft 16. The upper shaft 15 and the lower shaft 16 are fitted together by spline fitting or serration fitting. Thus, the upper shaft 15 and the lower shaft 16 can rotate together and move relative to each other along the axial direction X. The steering shaft 3 can be extended and contracted in the axial direction X by moving the upper shaft 15 in the axial direction X relative to the lower shaft 16.

The column jacket 4 is generally a hollow member extending in the axial direction X. The column jacket 4 houses the steering shaft 3. The column jacket 4 has a cylindrical inner jacket 17 and a cylindrical outer jacket 18 that extend in the axial direction X.

The inner jacket 17 is positioned on the rear side X1 of the outer jacket 18 so as to be coaxial with the outer jacket 18. The outer jacket 18 houses a part of the inner jacket 17. More specifically, a front portion 17A of the inner jacket 17 is inserted from the rear side X1 into a rear end 18A of the outer jacket 18. In this state, the inner jacket 17 can move in the axial direction X relative to the outer jacket 18. This relative movement enables the whole column jacket 4 to be extended and contracted in the axial direction X.

The column jacket 4 supports the steering shaft 3 via a bearing 19 and a bearing 20 such that the steering shaft 3 is rotatable. More specifically, a rear end 17B of the inner jacket 17 is coupled to the upper shaft 15 via the bearing 19. The inner jacket 17 supports the upper shaft 15 via the bearing 19 such that the upper shaft 15 is rotatable. A front end 18B of the outer jacket 18 is coupled to the lower shaft 16 via the bearing 20. The outer jacket 18 supports the lower shaft 16 via the bearing 20 such that the lower shaft 16 is rotatable.

The upper shaft 15 and the inner jacket 17 coupled together are movable in the axial direction X relative to the lower shaft 16 and the outer jacket 18 coupled together via the bearing 20. Thus, the column jacket 4 can be extended and contracted in the axial direction X along with the steering shaft 3.

The extension and contraction of the steering shaft 3 and the column jacket 4 are referred to as telescopic extension and contraction. This extension and contraction adjustment, in other words, telescopic positional adjustment for the steering member 8 in the axial direction X is referred to as telescopic adjustment.

The lower bracket 5 supports the front end 18B of the outer jacket 18 and couples the steering system 1 to the vehicle body 2. The lower bracket 5 includes a lateral pair of movable brackets 5A fixed to the outer jacket 18, a fixed bracket 5B fixed to the vehicle body 2, and a central shaft 5C extending in the lateral direction Y. The movable bracket 5A is supported by the fixed bracket 5B so as to be able to tilt around the central shaft 5C. The column jacket 4 as a whole can be tilted up and down around the central shaft 5C along with the steering shaft 3. A general up-down direction around the central shaft 5C is referred to as a tilt direction. Orientation adjustment of the steering member 8 by tilting is referred to as tilt adjustment.

Figure 2:
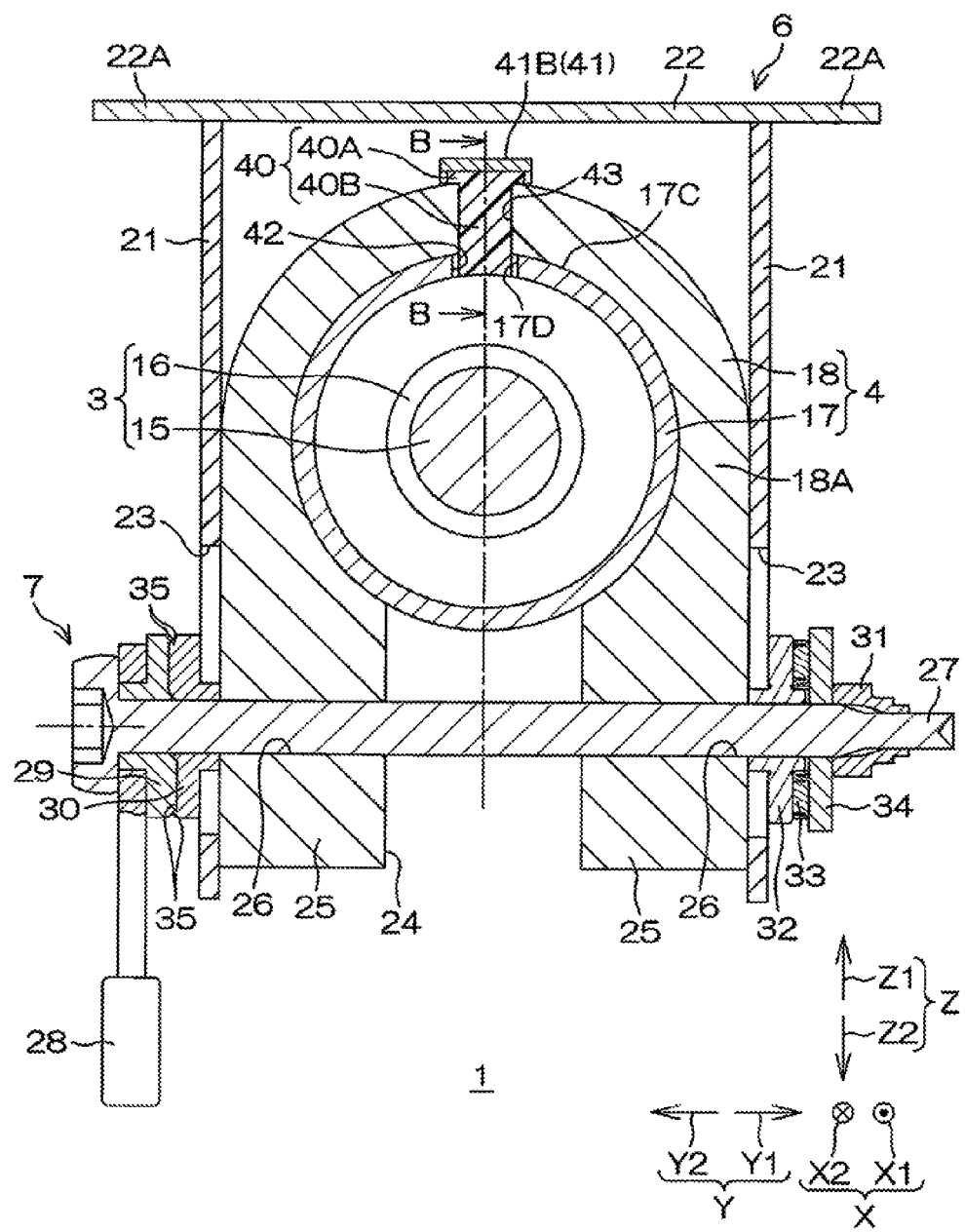
FIG. 2 is a sectional view taken along line A-A in FIG. 1.

The upper bracket 6 supports a portion of the outer jacket 18 on the rear side X1 and couples the steering system 1 to the vehicle body 2. FIG. 2 is a sectional view taken along line A-A in FIG. 1. As seen in FIG. 2, the upper bracket 6 is shaped like a groove that is open downward and symmetrical in the lateral direction with respect to the column jacket 4 so as to have a generally U shape turned upside down as viewed in the axial direction X. More specifically, the upper bracket 6 integrally includes a pair of side plates 21 that is thin in the lateral direction Y while facing each other in the lateral direction across the column jacket 4 and a coupling plate 22 that is coupled to upper ends of the side plates 21 and that is thin in the up-down direction Z.

In each of the side plates 21, a tilt groove 23 is formed at the same position as viewed in the lateral direction Y. The tilt groove 23 extends in the up-down direction Z, to be exact, in the above-described tilt direction. The coupling plate 22 has portions 22A extending outward of the side plates 21 in the lateral direction Y. The upper bracket 6 as a whole is fixed to the vehicle body 2 (see FIG. 1) via bolts (not depicted in the drawings) or the like inserted through the portions 22A.

In the rear end 18A of the outer jacket 18, a slit 24 is formed which extends in the axial direction X so as to penetrate a lower end of the outer jacket 18 in the up-down direction Z. In the rear end 18A of the outer jacket 18, a pair of support portions 25 is integrally provided, which is shaped like a block extending toward the lower side Z2 while defining the slit 24 in the lateral direction Y.

In each of the support portions 25, a circular through-hole 26 is formed which penetrates the support portion 25 in the lateral direction Y. The through-holes 26 in the support portions 25 are located at the same position as viewed in the lateral direction Y and overlap parts of the tilt grooves 23 in the side plates 21 of the upper bracket 6.

The lock and unlock mechanism 7 is a mechanism that allows the tilt adjustment or the telescopic adjustment of the steering member 8 (see FIG. 1) and locks the position of the steering member 8 for which the tilt adjustment or the telescopic adjustment has been completed.

The lock and unlock mechanism 7 includes a rotating shaft 27, an operation member 28, a ring-like cam 29 and a cam follower 30, a nut 31, a ring-like interposition member 32, a needle roller bearing 33, and a thrust washer 34.

The rotating shaft 27 is shaped like a rod extending in the lateral direction Y and passes through the through-holes 26 and the tilt grooves 23. The rotating shaft 27 is supported by the side plates 21 of the upper bracket 6 on the lower side Z2 of the inner jacket 17.

The operation member 28 is a lever that can be grasped and is attached to a left end of the rotating shaft 27, which is on the left side Y2 of the left side plate 21.

A portion of the left end of the rotating shaft 27 between the operation member 28 and the side plate 21 on the left side Y2 passes through the cam 29 and the cam follower 30 in this order from the left side Y2. The cam 29 can rotate together with the rotating shaft 27, whereas the cam follower 30 can rotate relative to the rotating shaft 27 and move in the lateral direction Y A nut 31 is attached to a right end of the rotating shaft 27 positioned on the right side Y1 of the right side plate 21. A portion of the rotating shaft 27 between the nut 31 and the right side plate 21 passes through the interposition member 32, the needle roller bearing 33, and the thrust washer 34 in this order from the left side Y2.

The rotating shaft 27 can move through the tilt grooves 23 in the upper bracket 6 in the above-described tilt direction. When the driver or the like moves the steering member 8 in the up-down direction Z for the tilt adjustment, the column jacket 4 is tilted to the extent that the rotating shaft 27 can move through the tilt grooves 23.

When the driver tilts the operation member 28 around the rotating shaft 27 after performing the telescopic adjustment or the tilt adjustment, the cam 29 rotates, and cam protrusions 35 formed on the cam 29 and the cam follower 30 are placed on the cam follower 30 and the cam 29, respectively. Thus, the cam follower 30 moves toward the right side Y1 along the rotating shaft 27 and is pressed against the side plate 21 on the left side Y2. Consequently, the side plates 21 are clamped between the cam follower 30 and the interposition member 32 from the opposite sides of the lateral direction Y, causing a frictional force to be exerted between each of the side plates 21 and the corresponding support portion 25. The frictional force causes the position of the column jacket 4 in the tilt direction is locked, thus locking the steering member 8 at a position after the tilt adjustment.

The support portions 25 are sandwiched between the side plates 21 to reduce the distance between the support portions 25. Thus, an inner peripheral portion of the outer jacket 18 is narrowed to cause the outer jacket 18 to externally compress the inner jacket 17 in the outer jacket 18. As a result, a frictional force is exerted between the inner jacket 17 and the outer jacket 18, thereby locking the position of the inner jacket 17 in the axial direction X and also locking the steering member 8 at a position after the telescopic adjustment.

A state of the steering system 1 where the position of the steering member 8 is fixed in the tilt direction and the axial direction X as described above is referred to as a locked state.

In the steering system 1 in the locked state, when the operation member 28 is tilted in a direction opposite to the above-described direction, the cam 29 rotates with respect to the cam follower 30, and the cam protrusions 35 on the cam 29 and the cam follower 30 are disengaged from the cam follower 30 and the cam 29, respectively. Thus, the cam follower 30 moves toward the left side Y2 along the rotating shaft 27. Then, the side plates 21 between the cam follower 30 and the interposition member 32 are unclamped. Consequently, the above-described frictional force is eliminated, allowing the steering member 8 to move in the axial direction X and the tilt direction. This enables the telescopic adjustment or the tilt adjustment for the steering member 8 again.

A state of the steering system 1 where the position of the steering member 8 is unfixed in the tilt direction and the axial direction X is referred to as an unlocked state.

Figure 3:
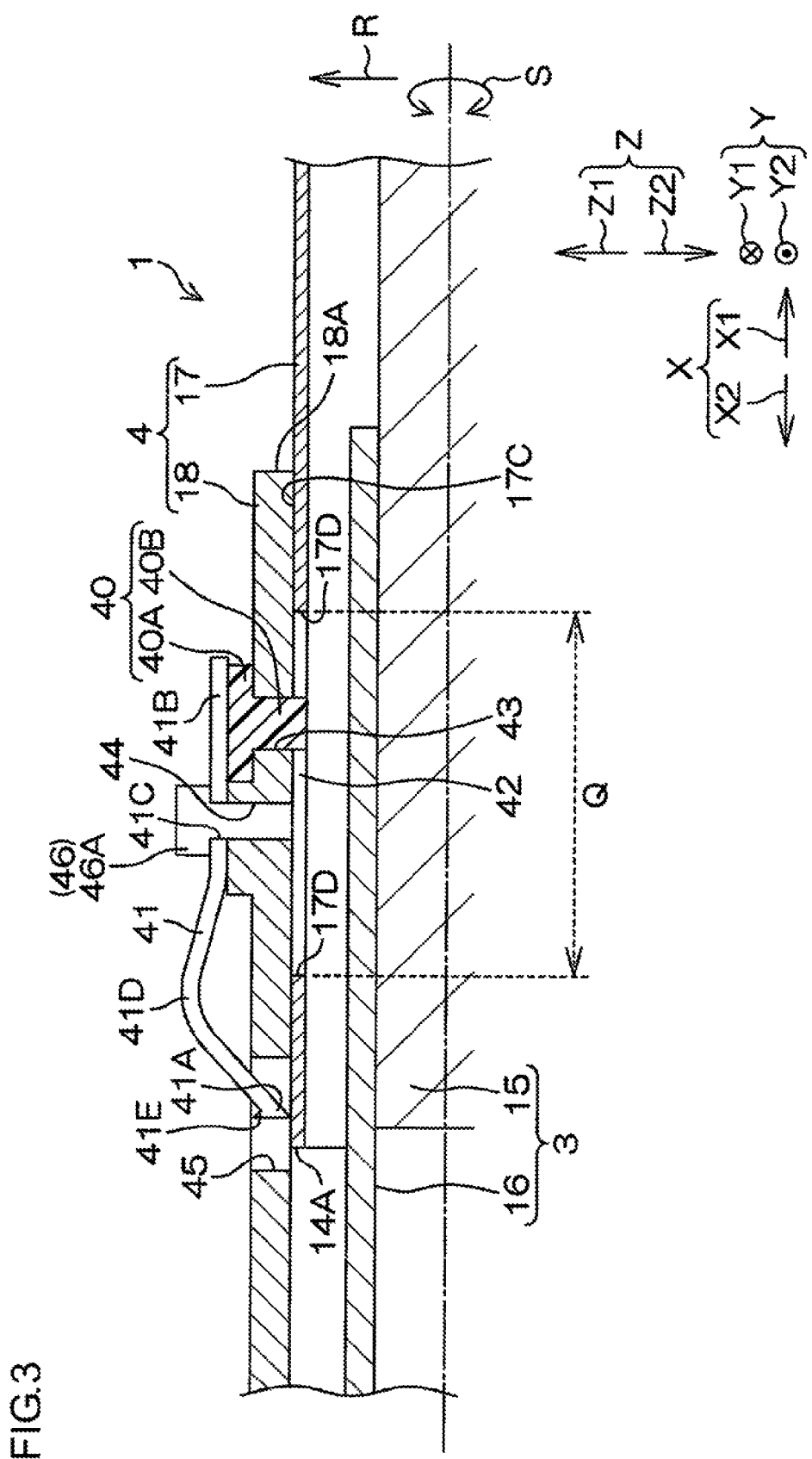
FIG. 3 is a sectional view taken along line B-B in FIG. 2.

A regulation member 40 and an elastic member 41 included in the steering system 1 will be described. In connection with the regulation member 40 and the elastic member 41, an insertion hole 42 extending in the axial direction X is formed in an intermediate area of an upper, outer surface 17C of the inner jacket 17 in the axial direction X as seen in FIG. 3 that is a sectional view taken along line B-B in FIG. 2. The insertion hole 42 is a slot that penetrates the inner jacket 17 at a position on a periphery thereof and that is elongate in the axial direction X. The inner jacket 17 has a peripheral portion 17D that borders the insertion hole 42 on the opposite sides in a longitudinal direction and on the opposite sides in a transverse direction. Thus, the insertion hole 42 is closed by the peripheral portion 17D on the opposite sides in the longitudinal direction.

In an area of the outer jacket 18 that is closer to the rear end 18A, at the same position as that of the insertion hole 42 in a circumferential direction S around the steering shaft 3, a first through-hole 43, a threaded hole 44, and a second through-hole 45 that penetrate the outer jacket 18 at a position on a periphery thereof are formed in this order from the rear side X1. During the telescopic adjustment, the first through-hole 43 is constantly located at the same position as that of any part of the insertion hole 42 in the axial direction X and lies on the upper side Z1 of the insertion hole 42 so as to face the insertion hole 42. On the other hand, during the telescopic adjustment, the second through-hole 45 is constantly located away from the insertion hole 42 toward the front side X2 in the axial direction X.

The regulation member 40 is a pin formed of a material that can be sheared such as resin. The regulation member 40 integrally has a disc-shaped base portion 40A, and a cylindrical shaft portion 40B that has a smaller diameter than the base portion 40A and that protrudes coaxially with the base portion 40A from the base portion 40A toward the lower side Z2. The base portion 40A abuts a peripheral portion of the first through-hole 43 in the outer jacket 18 from the upper side Z1, and the shaft portion 40B passes through the first through-hole 43. Thus, the regulation member 40 is fixed to the outer jacket 18. A lower end of the shaft portion 40B sticks out from the first through-hole 43 toward the lower side Z2 and is inserted through the insertion hole 42 in the inner jacket 17.

Thus, the distance of relative movement between the inner jacket 17 and the outer jacket 18 in the axial direction X during the telescopic adjustment (what is called a telescopic stroke) is regulated to within a range Q in which the shaft portion 40B can move in the axial direction X within the insertion hole 42. Consequently, the column jacket 4 can be extended and contracted within the range Q.

As described above, since the insertion hole 42, which is a slot allowing the telescopic stroke to be regulated, is formed in the inner jacket 17 rather than in the outer jacket 18, the outer jacket 18 can be made more rigid. The inner jacket 17, in which the insertion hole 42 is formed, is reinforced by being surrounded by the outer jacket 18. This suppresses a reduction in rigidity of the inner jacket 17 attributed to the insertion hole 42.

The elastic member 41 is shaped like a band that is long in the axial direction X, and is elastically deformable in a thickness direction of the elastic member 41. For example, a leaf spring may be used as the elastic member 41. A front end portion of the elastic member 41 is referred to as a tip portion 41A, and a rear end portion of the elastic member 41 is referred to as a facing portion 41B. In the elastic member 41, a through-hole 41C is formed in an area between the tip portion 41A and the facing portion 41B.

The elastic member 41 is attached to the outer jacket 18 from the upper side Z1, A clamping member 46 such as a bolt is inserted through the through-hole 41C and engaged with the threaded hole 44 in the outer jacket 18. Consequently, a peripheral portion of the through-hole 41C is sandwiched between a head portion 46A of the clamping member 46 and the outer jacket 18. Thus, the elastic member 41 is fixed to the outer jacket 18. The clamping member 46 is not limited to the bolt but may be a rivet. In this case, no thread is formed in the threaded hole 44, and the clamping member 46 is press-fitted into the threaded hole 44.

A curved portion 41D of the elastic member 41 extending from the through-hole 41C to the tip portion 41A is first curved toward the upper side Z1 closer to the front side X2. The curved portion 41D is then curved toward the lower side Z2 closer to the tip portion 41A, and is led, at a midway part thereof toward the tip portion 41A, into the second through-hole 45 in the outer jacket 18 from the rear side X1 and the upper side Z1. The tip portion 41A is arranged on the outer surface 17C of the inner jacket 17 at a position away from the insertion hole 42 in the inner jacket 17 toward the front side X2 in the axial direction X. The elastic member 41 in this state does not hinder the relative movement between the inner jacket 17 and the outer jacket 18, in other words, the extension and contraction of the column jacket 4, because the tip portion 41A is not fitted in the insertion hole 42. The tip portion 41A of the elastic member 41 in this state is biased by the curved portion 41D to externally elastically contact the inner jacket 17. More specifically, the tip portion 41A presses the outer surface 17C of the inner jacket 17.

The facing portion 41B of the elastic member 41 is provided outside the outer jacket 18 so as to face the base portion 40A in a radial direction R around the steering shaft 3. More specifically, the facing portion 41B is in contact with the base portion 40A so as to cover the base portion 40A from the upper side Z1. This prevents the regulation member 40 from falling outward from the outer jacket 18 not only during normal traveling but also at the time of vehicular collision. In particular, the clamping member 46 fixes to the outer jacket 18 a part of the elastic member 41, which is close to the facing portion 41B, and thus, the facing portion 41B is in contact with the base portion 40A in a stable orientation. Thus, the facing portion 41B can be reliably positioned so as not to cause falling of the regulation member 40.

Figure 4:
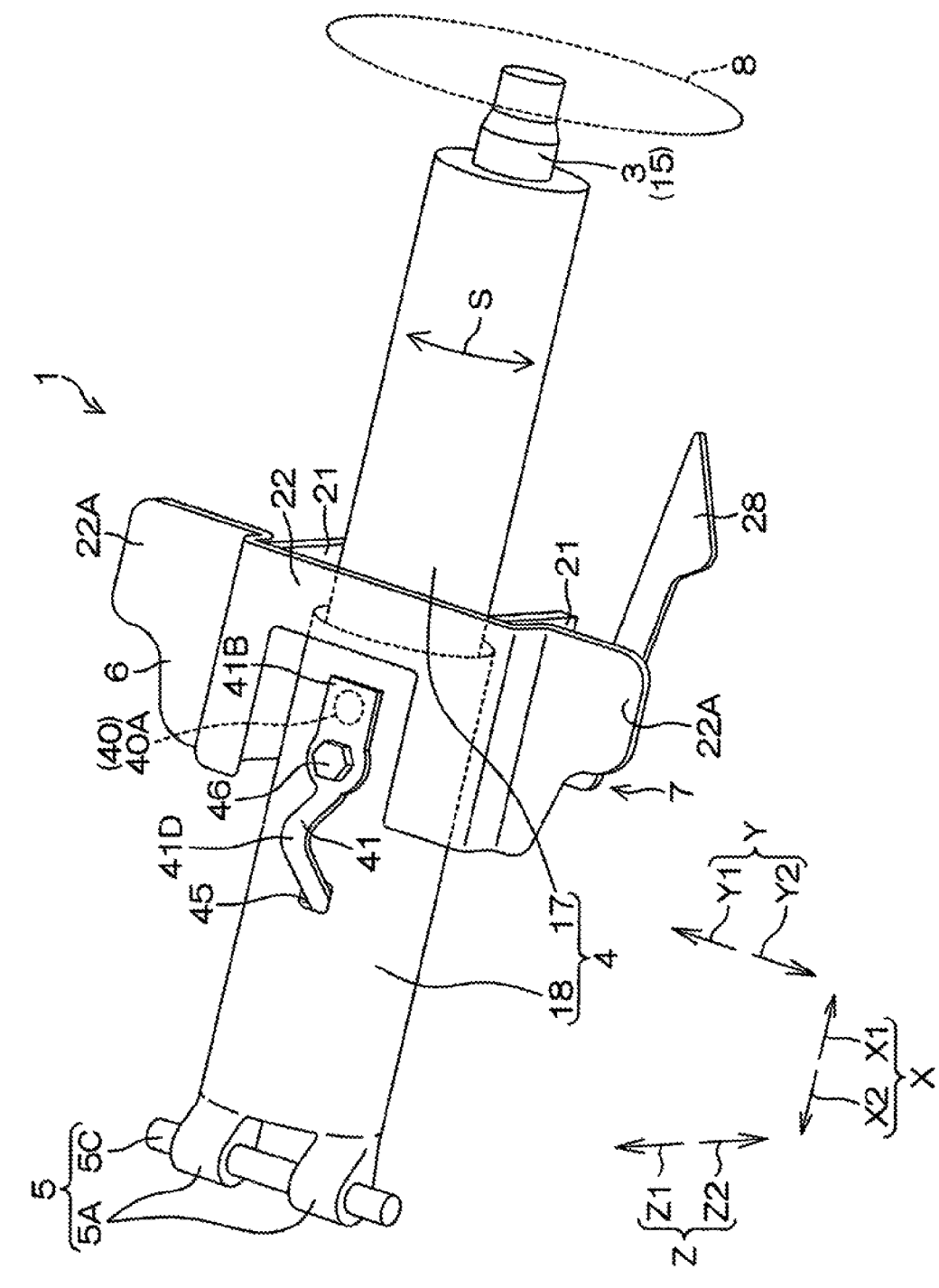
FIG. 4 is a perspective view of the steering system.

The state where the elastic member 41 is attached to the outer jacket 18 as described above is also depicted in a perspective view in FIG. 4. The facing portion 41B of the elastic member 41 may be wider than the curved portion 41D so as to completely cover the base portion 40A from the upper side Z1.

Motions made in the steering system 1 at the time of vehicular collision will be described. At the time of vehicular collision, what is called a secondary collision may occur in which the driver collides against the steering member 8 from the rear side X1.

When the steering system 1 is in the locked state, impact resulting from the secondary collision is transmitted to the inner jacket 17 via the steering member 8 and the upper shaft 15. Thus, the inner jacket 17 moves toward the front side X2 along with the steering member 8 and the upper shaft 15 while sliding on an inner peripheral surface of the outer jacket 18. In other words, the inner jacket 17 and the outer jacket 18 move relative to each other at the time of vehicular collision. Consequently, the column jacket 4 is contracted in the axial direction X.

In conjunction with the contraction of the column jacket 4, the position of the regulation member 40 within the insertion hole 42 in the inner jacket 17 is shifted toward the rear side X1. Accordingly, the peripheral portion 17D of the inner jacket 17, which borders a rear end of the insertion hole 42, approaches the shaft portion 40B of the regulation member 40 from the rear side X1.

When the peripheral portion 17D collides against the shaft portion 40B of the regulation member 40 from the rear side X1 as a result of the relative movement between the inner jacket 17 and the outer jacket 18, the regulation member 40 is sheared such that the shearing starts at a point on the shaft portion 40B against which the peripheral portion 17D collides, for example.

Figure 5:
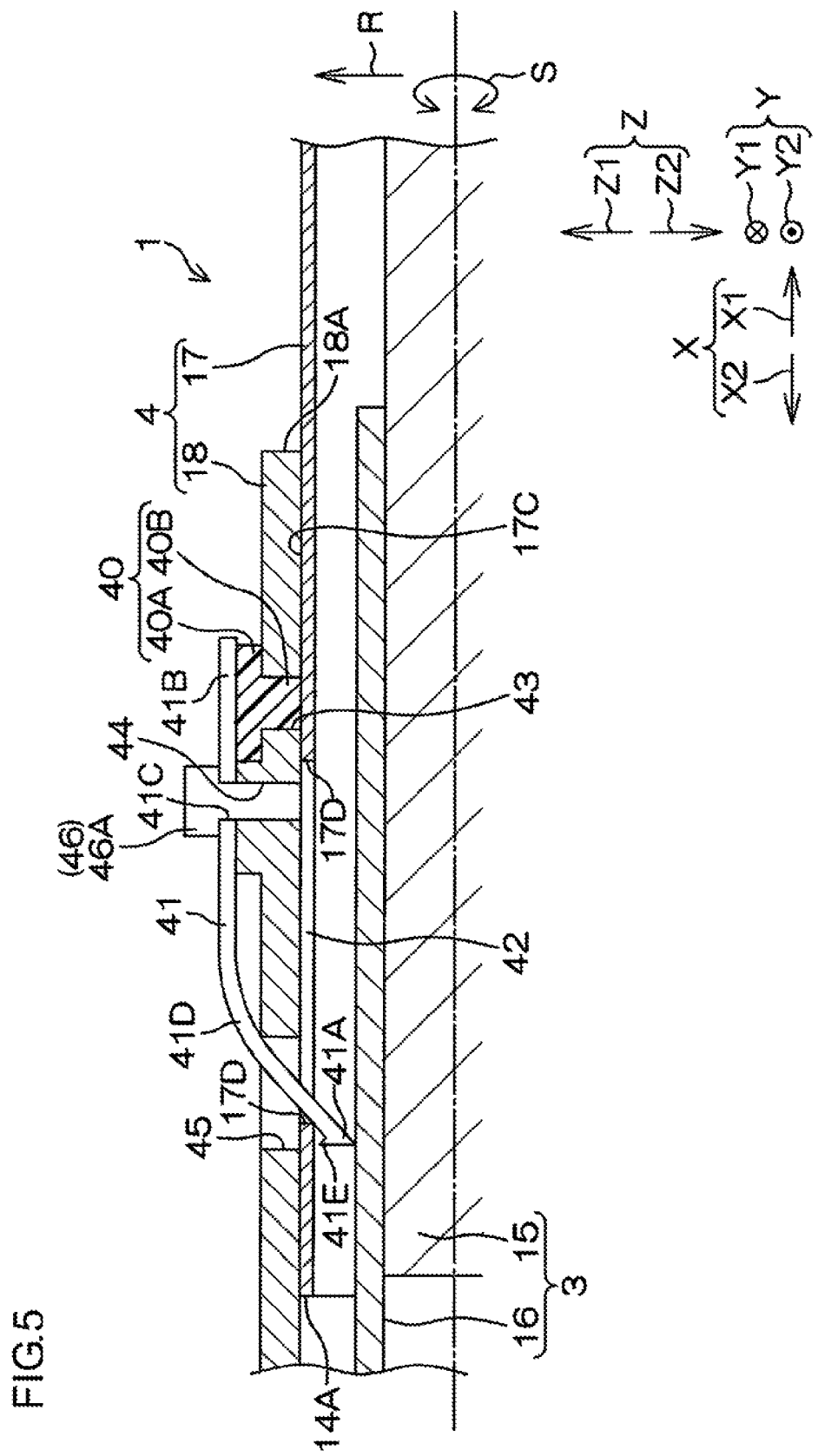
FIG. 5 is a diagram corresponding to FIG. 3 and depicting a state resulting from vehicular collision.

FIG. 5 depicts the sheared regulation member 40. After the telescopic adjustment is made so as to minimize the length of the column jacket 4, the peripheral portion 17D is in contact with the shaft portion 40B of the regulation member 40 from the rear side X1. Thus, when vehicular collision occurs in this state, the regulation member 40 is immediately sheared by the peripheral portion 17D.

In the sheared regulation member 40, although a part of the shaft portion 40B located on the lower side Z2 of the sheared point falls into the inner jacket 17 through the insertion hole 42, the remaining part of the regulation member 40 including the base portion 40A remains fixed to the outer jacket 18.

The shearing of the regulation member 40 causes the inner jacket 17 to be released toward the front side X2 to further move forward. Thus, a load needed to release the inner jacket 17 (release load) can be generated with a simple structure in which the regulation member 40 fixed to the outer jacket 18 simply passes through the insertion hole 42 of the inner jacket 17.

The insertion hole 42 has the same length as the above-described telescopic stroke. This configuration enables suppression of a reduction in rigidity of the inner jacket 17 attributed to the insertion hole 42, compared to a configuration in which the length of the insertion hole 42 is set equal to or larger than the telescopic stroke so as to allow the regulation member 40 to be guided after the release load is generated.

At the time of vehicular collision, the facing portion 41B of the elastic member 41 constantly positions the regulation member 40 so as to prevent possible backlash of the regulation member 40. Thus, the regulation member 40 can be reliably sheared by the peripheral portion 17D. The regulation member 40 is not sheared at a plurality of points but at a single point as described above. As a result, the regulation member 40 is sheared at the single point in a concentrated manner, allowing a stable release load to be generated.

When the inner jacket 17 moves toward the front side X2, a front end of the insertion hole 42 aligns with the second through-hole 45 in the outer jacket 18 in the axial direction X as depicted in FIG. 5. Then, the elastic member 41 is elastically deformed such that the tip portion 41A of the elastic member 41, which has been pressing the inner jacket 17, approaches the insertion hole 42 in the inner jacket 17. Thus, the tip portion 41A is fitted in the insertion hole 42. At this time, the curved portion 41D of the elastic member 41 on the tip portion 41A side is inserted through the insertion hole 42 from the rear side X1 and the upper side Z1 so as to extend across both the insertion hole 42 and the second through-hole 45 in the outer jacket 18. This allows the inner jacket 17 and the outer jacket 18 to be coupled together via the elastic member 41. Consequently, even when the steering member 8 is pulled toward the rear side X1 after vehicular collision, the tip portion 41A is caught in the inner jacket 17 from the rear side X1, thereby preventing a situation where the inner jacket 17 is detached from the outer jacket 18 and the steering member 8 is pulled out.

The tip portion 41A of the elastic member 41 preferably has a hook-like engagement portion 41E at a tip thereof. The engagement portion 41E sticks to the inside (the steering shaft 3 side) of the insertion hole 42 and is engaged, from the inside, with the peripheral portion 17D of the insertion hole 42 in the inner jacket 17. Therefore, the tip portion 41A can be prevented from slipping out from the insertion hole 42. Thus, the inner jacket 17 and the outer jacket 18 are reliably coupled together via the elastic member 41. This allows prevention of a situation where the inner jacket 17 is detached from the outer jacket 18 after vehicular collision.

Impact resulting from a secondary collision is absorbed by sliding of the inner jacket 17 with respect to the outer jacket 18 before movement of the inner jacket 17 is stopped after the secondary collision and by shearing of the regulation member 40.

The present invention is not limited to the above-described embodiment but various changes may be made to the embodiment.

For example, for each of the regulation member 40 and the elastic member 41, dimensions and materials may be changed to the extent that the above-described functions can be accomplished. In particular, the release load can be adjusted by changing the thickness, the material, and the like of the regulation member 40.

The clamping member 46 that fixes the elastic member 41 to the outer jacket 18 is, in the above-described embodiment, positioned on the front side X2 with respect to the regulation member 40 to fix a part of the elastic member 41 located between the tip portion 41A and the facing portion 41B to the outer jacket 18. The present invention is not limited to this configuration. The clamping member 46 may be positioned on the rear side X1 of the regulation member 40 to fix a part of the facing portion 41B, which is on the opposite side from the tip portion 41A, to the outer jacket 18.

Figure 6:
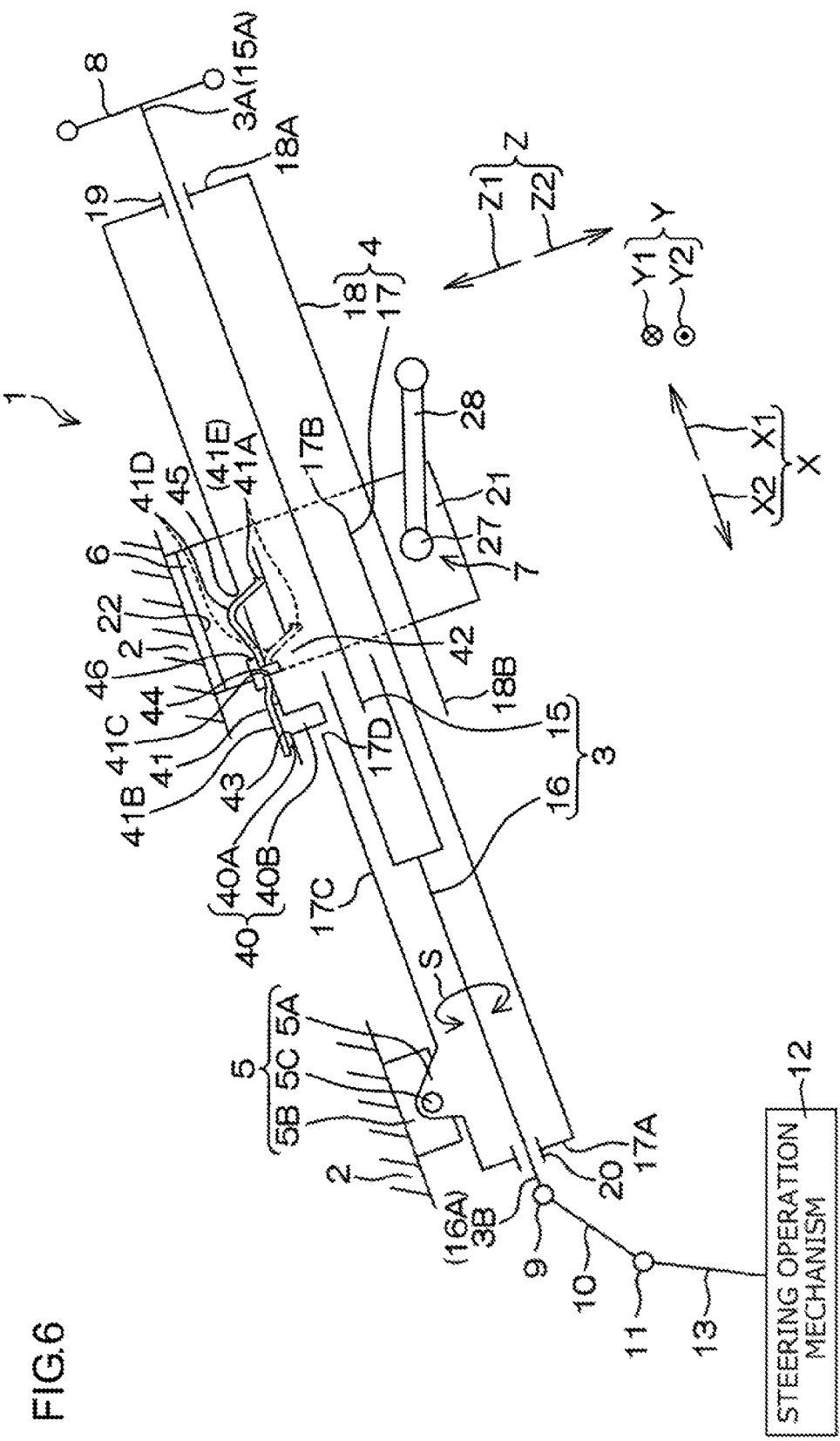
FIG. 6 is a schematic diagram of a steering system according to a variation.

The positions of the inner jacket 17 and the outer jacket 18 in the axial direction X may be reversed. In the steering system 1 according to a variation depicted in FIG. 6, the inner jacket 17 supports the lower shaft 16 via the bearing 20. On the other hand, the outer jacket 18 is located on the rear side X1 of the inner jacket 17 to support the upper shaft 15 via the bearing 19. For extension and contraction of the column jacket 4, the outer jacket 18 can move relative to the inner jacket 17 in the axial direction X. To allow the outer jacket 18 to move in the axial direction X, the through-hole 26 (see FIG. 2) in the support portion 25 of the outer jacket 18 through which the rotating shaft 27 is inserted is elongate in the axial direction X The above-described first through-hole 43, threaded hole 44, and second through-hole 45 are provided in this order from the front side X2 in an area of the outer jacket 18 on the front end 18B side.

The elastic member 41 is fixed to the outer jacket 18 such that its orientation is reversed in the front-rear direction compared to the above-described embodiment (see FIG. 1). Thus, in the variation, the rear end portion of the elastic member 41 corresponds to the tip portion 41A, and the front end portion of the elastic member 41 corresponds to the facing portion 41B. The curved portion 41D of the elastic member 41 extending from the through-hole 41C to the tip portion 41A is first curved toward the upper side Z1 closer to the rear side X1 The curved portion 41D is then curved toward the lower side Z2 closer to the tip portion 41A, and is led, at a midway part thereof toward the tip portion 41A, into the second through-hole 45 in the outer jacket 18 from the front side X2 and the upper side Z1. The tip portion 41A is arranged on the outer surface 17C of the inner jacket 17 at a position away from the insertion hole 42 in the inner jacket 17 toward the rear side X1 in the axial direction X.

The steering system 1 in the variation is the same as in the above-described embodiment (see FIG. 1) except for the above-described configuration.

When the steering system 1 in the variation is in the locked state, the impact resulting from the secondary collision is transmitted to the outer jacket 18 via the steering member 8 and the upper shaft 15. Thus, the outer jacket 18 moves toward the front side X2 along with the steering member 8 and the upper shaft 15 while sliding on an outer peripheral surface (outer surface 17C) of the inner jacket 17. Consequently, the column jacket 4 is contracted in the axial direction X.

In conjunction with the contraction of the column jacket 4, the position of the regulation member 40 within the insertion hole 42 in the inner jacket 17 is shifted toward the front side X2. Accordingly, the peripheral portion 17D of the inner jacket 17, which borders a front end of the insertion hole 42, approaches the shaft portion 40B of the regulation member 40 from the front side X1.

When the peripheral portion 17D collides against the shaft portion 40B of the regulation member 40 from the front side X2 as a result of the relative movement between the inner jacket 17 and the outer jacket 18, the regulation member 40 is sheared such that the shearing starts at a point on the shaft portion 40B against which the peripheral portion 17D collides, for example.

At this time, the rear end of the insertion hole 42 aligns with the second through-hole 45 in the outer jacket 18 in the axial direction X. Then, the elastic member 41 is elastically deformed such that the tip portion 41A of the elastic member 41, which has been pressing the inner jacket 17, approaches the insertion hole 42 in the inner jacket 17. Thus, the tip portion 41A is fitted in the insertion hole 42 as depicted by a dashed line in FIG. 6. At this time, the curved portion 41D of the elastic member 41 on the tip portion 41A side is inserted through the insertion hole 42 from the front side X2 and the upper side Z1 so as to extend across both the insertion hole 42 and the second through-hole 45 in the outer jacket 18. This allows the inner jacket 17 and the outer jacket 18 to be coupled together via the elastic member 41. Consequently, even when the steering member 8 is pulled toward the rear side X1 after vehicular collision, the tip portion 41A is caught in the inner jacket 17 from the front side X1, thereby preventing a situation where the inner jacket 17 is detached from the outer jacket 18 and the steering member 8 is pulled out. To maintain the tip portion 41A of the elastic member 41 caught on the peripheral portion 17D of the insertion hole 42, the tip of the tip portion 41A may be provided with the above-described hook-like engagement portion 41E.

In the above-described embodiment and variation, the insertion hole 42 formed in the inner jacket 17 is a through-hole. However, the insertion hole 42 may be a groove extending in the axial direction X and having a bottom surface.

The steering system 1 is not limited to a manual steering system with no assistance for the steering of the steering member 8 but may be a column-assist electric power steering system in which the steering of the steering member 8 is assisted by an electric motor.

What is claimed is:

1. A steering system comprising:
a steering member;
a steering shaft to which the steering member is coupled at one end of the steering shaft and which is configured to extend and contact in an axial direction;
a column jacket having an inner jacket in which an insertion hole extending in the axial direction is provided in an outer surface of the inner jacket and which supports the steering shaft, and an outer jacket that houses the inner jacket to support the steering shaft, the column jacket configured to extend and contract in the axial direction along with the steering shaft as a result of relative movement between the inner jacket and the outer jacket in the axial direction;
a regulation member that is fixed to the outer jacket and passes through the insertion hole and that regulates a distance of the relative movement between the inner jacket and the outer jacket to within a range in which the regulation member is allowed to move in the axial direction within the insertion hole, the regulation member allowed to be sheared; and
an elastic member that has a tip portion arranged on the outer surface of the inner jacket at a position away from the insertion hole in the axial direction and that is fixed to the outer jacket, wherein
when, at a time of vehicular collision, the regulation member is sheared by a peripheral portion of the insertion hole in the inner jacket in conjunction with the relative movement between the inner jacket and the outer jacket, the elastic member is elastically deformed so that the tip portion is fitted in the insertion hole.

2. The steering system according to claim 1, wherein the inner jacket is located more toward the steering member than the outer jacket, and is movable in the axial direction to allow the column jacket to extend and contract.

3. The steering system according to claim 1, wherein the elastic member has a facing portion provided outside the outer jacket so as to face the regulation member.

4. The steering system according to claim 1, wherein the tip portion has an engagement portion configured to be engaged with the peripheral portion of the insertion hole in the inner jacket.

* * * * *